Patented June 24, 1952

2,601,468

UNITED STATES PATENT OFFICE 2,601,468

PROCESS OF STABILIZING CALCIUM LITHOL TONERS

Volney Tullsen, Westfield, and Frederick Ludwig Pfeiffer, Chatham, N. J., assignors to American Cyanamid Company, New York, N. Y., a corporation of Maine No Drawing. Application September 27, 1949, Serial No. 118,178

4 Claims. (Cl. 260—33.4)

This invention relates to new processes of producing calcium lithol toners.

One of the most important recent developments in the printing ink field has been the introduction of so-called vapor setting inks, which dry by precipitation on contact with moisture. These inks are formulated with a high-boiling water-soluble vehicle, such as diethylene glycol, and special synthetic resins which are soluble in the vehicle but lose their solubility when the solvent is diluted with water. The inks are printed in the usual manner, and then exposed to steam, water vapor, or (in some cases) simply to the ordinary moisture of the atmosphere. The resulting dilution of the vehicle causes precipitation and setting.

These inks offer striking practical advantages, including cleanness and brilliance of color, freedom from odor, and fast setting, and consequently have found widespread use in a number of important applications. Nevertheless their adoption has been hindered by the serious drawback that certain of the most important known pigments have not proved well suited for use in vapor setting formulations, but create serious practical difficulties when such use is attempted.

One of the most important types of pigments are the so-called lithol toners, which are prepared by diazotizing Tobias acid (2-naphthylamine-1-sulfonic acid) and coupling with beta-naphthol. For shading purposes, the Tobias acid is frequently mixed with a portion of another amino sulfonic acid, such as 1-naphthylamine-2-sulfonic acid. These colors are usually employed in the form of their alkaline earth metal lakes. Unfortunately when these lakes are incorporated in vapor setting inks, they exhibit a serious color instability and also show a strong tendency to cause the ink to "body," or gain in viscosity. For example, barium lithols shift color from the desired bright red to a dull orange shade, and the ink increases in viscosity until it becomes useless and is practically semi-solid.

The calcium lakes are somewhat less unstable than the barium and strontium lakes, but they are still sufficiently unstable to present a serious problem which has interferred with their use in vapor setting inks.

According to the present invention it has been found that the calcium lakes may be transformed into stable compounds by relatively simple processes. The change in the characteristics of the lakes when subjected to the processes of the present invention is a very real one and it probably is a change in physical form. However, this change can not be shown on X-ray diffraction measurements.

Throughout the specification and claims the term "lithol toners" will be used to denote lakes of the azo dyes obtained by coupling beta-naphthol with a diazo compound having diazotized Tobias acid as its major constituent.

The processes of the present invention comprise essentially heating the unstable calcium lithol toners with an oxygen-containing organic liquid selected from the group consisting of mono-, di- and triethyleneglycols, dioxane. The process starts when the temperature is raised above room temperature, but is too slow for economical practical use below 50° C. At higher temperatures the change is more rapid, but of course, the temperature must be kept below that at which either the solvent or the pigment starts to decompose. This sets a practical limit with most solvents of about 200° C.

As with most transformations of organic pigments, the time required for composition will vary with the temperature. Good results can be obtained with calcium lithol toners when it is exposed to diethylene glycol at 50° C. for from three hours to a day. At higher temperatures, the time is much shorter, the minimum time being about ten minutes for practical operation at maximum temperature. Inasmuch as longer heating, within reason, does not damage the stabilized toner, it is usually desirable to heat for a little longer than the absolute minimum time, as the change can be made to work at any particular temperature. It is important in practical operations to be sure that the physical change to the stable crystal form is complete. Such a procedure requires a minimum of critical control, which is a practical operating advantage.

While mono-, di- or triethylene glycol can be used, diethylene glycol is preferred because this is a common solvent in vapor setting inks, and it is thus possible to produce a mixture from the heating step which can be incorporated into an ink without separation of the stabilized lithol toner from the solvent in which it is stabilized.

It is another advantage of the present invention that the amount of solvent is not critical. Of course, it is necessary to use sufficient solvent to thoroughly wet the pigment. Somewhat larger amounts of solvent, for example, an amount equal to the weight of the pigment, would give better operating conditions since it would permit stirring which, though not essential, is desirable. Larger amounts of solvent do no harm but as they do not improve the results they are normally not desirable as excessively large amounts will increase the cost of operation.

As has been pointed out above, the suspension, or dispersion, of the pigment in the solvent may be used directly for incorporation into a vapor setting ink. For some purposes, however, it is desirable to market a dry pigment, and this may be accomplished easily by filtering the pigment after stabilization, washing it with water, and drying. It is an advantage of the present invention that once stabilized the lithol toner can be kept indefinitely without losing its desirable properties.

Since vapor setting inks are usually prepared with solvents of the same class as those used in stabilization, they have been investigated and form the basis of a second modification of the general process of the present invention. When such inks are heated they body and become too thick for use in printing, in some cases almost semi-solid. However, the heat treatment produces the same change in the calcium lithol toner as does heating in the solvent alone. In other words, the resins and other constituents of the ink do not appear to interfere with the transformation of the unstable calcium lithol toner into the stable form because when the bodied ink is re-milled to printing consistency it will keep indefinitely, and the calcium lithol toner exhibits the same color and solvent stability. The re-milling may be effected on the usual types of equipment, such as a multiple-roller ink mill. For certain purposes this second modification of the process presents advantages and is therefore included within the scope of the invention.

The invention will be described in greater detail in conjunction with the following specific examples. The parts are by weight.

Example 1

The calcium lithol toner is prepared by coupling diazotized Tobias acid with beta-naphthol in the usual manner and transforming into the calcium lake. 357 parts of the calcium lithol toner thus produced is heated over night at 80° C. with 643 parts of diethylene glycol. There is then added 50 parts of diethylene glycol and 284 parts of an alcohol-soluble fumaric acid-modified alkyd resin having an acid number from 300–330 and softening point of 148–151° C. The mixture is transformed into a smooth ink by five passes on a three-roller ink mill. The color of the ink and its viscosity are stable on storage.

If an ink is prepared with the same ingredients, but without heating the lithol toner in diethylene glycol, its color shifts to a blue shade on storage and serious bodying takes place.

Example 2

The procedure of Example 1 is followed except that after heating with diethylene glycol the mixture is diluted with water, the pigment recovered by filtration, washed free of diethylene glycol, and dried. A product is obtained which keeps indefinitely and from which vapor setting inks of high stability can be prepared.

Example 3

The procedure of Example 2 is followed but dioxane is used in place of diethylene glycol. A product is obtained which gives vapor setting inks of increased stability, almost as stable as when diethylene glycol is used.

When an equal mixture of diethylene glycol and dioxane is employed, the product obtained is substantially the same as in Example 2.

Example 4

A vapor setting ink is prepared from 7 parts of calcium lithol toner, 23 parts of diethylene glycol and 16 parts of an alcohol-soluble fumaric acid-modified alkyd resin, having a softening point of 148–151° C. and an acid number of 300–330. The ink is made in the usual manner by milling on a three-roller ink mill. The ink is then heated at 80–100° C. until it has thickened to a useless, almost semi-solid condition and has changed markedly to a blue shade of red. The ink is then re-milled on a three-roller ink mill until its original fluidity is regained. This ink is stable and does not deteriorate on storage.

Example 5

10 parts of calcium lithol toner are heated with 20 parts of diethylene glycol at 60° C. for two hours. The mixture is then slurried with 700 parts of water, filtered, washed and dried. The resulting pigment gives stable vapor setting inks.

Example 6

10 parts of calcium lithol toner are heated overnight at 60° C. with 15 parts of ethylene glycol, then freely diluted with water, filtered, and dried. The resulting product gives vapor setting inks of high stability.

Example 7

20 parts of calcium lithol are heated at 75° C. for seventy hours in 40 parts of triethylene glycol, then diluted with 150 parts of water, filtered, washed and dried. The resulting pigment shows greatly enhanced stability in vapor setting inks over the untreated material.

We claim:

1. A process of transforming an unstable calcium lithol toner into a stable form which comprises heating the toner in an oxygen-containing organic liquid selected from the group consisting of mono-, di- and tri-ethylene glycols and dioxane at a temperature ranging from about 50° C. to about 200° C. and for a time period ranging from about 10 minutes to about 70 hours, until transformation into the stable form is substantially complete.

2. A process of transforming an unstable calcium lithol toner into a stable form which comprises heating the toner in an organic liquid comprising diethylene glycol at a temperature ranging from about 50° C. to about 200° C. and for a time period ranging from about 10 minutes to about 70 hours until transformation into the stable form is substantially complete.

3. A process of preparing a vapor setting ink containing stable calcium lithol toner which comprises milling an unstable calcium lithol toner into an alkyd resin containing an organic liquid selected from the group consisting of mono-, di- and tri-ethylene glycols and dioxane until an ink is formed, heating the ink until the unstable calcium lithol toner is transformed substantially completely into the stable form and re-milling the heated ink to printing viscosity.

4. A process of preparing a vapor setting ink containing stable calcium lithol toner which comprises milling an unstable calcium lithol toner into an alkyd resin solution in diethylene glycol until an ink is formed, heating the ink until the unstable calcium lithol toner is transformed substantially completely into the stable form and re-milling the heated ink to printing viscosity.

VOLNEY TULLSEN.
FREDERICK LUDWIG PFEIFFER.

REFERENCES CITED

The following references are of record in the file of this patent:

UNITED STATES PATENTS

| Number | Name | Date |
|---|---|---|
| 1,077,655 | Ulricks | Nov. 11, 1913 |
| 1,806,965 | Clewell | May 26, 1931 |
| 1,927,395 | Sayler | Sept. 4, 1934 |
| 2,138,836 | Brower | Dec. 6, 1938 |
| 2,174,501 | Reich | Sept. 26, 1939 |
| 2,306,863 | Bour | Dec. 29, 1942 |
| 2,335,882 | Pingarron | Dec. 7, 1943 |
| 2,375,230 | Kline | May 8, 1945 |

FOREIGN PATENTS

| Number | Country | Date |
|---|---|---|
| 859 | Great Britain | of 1863 |
| 117,163 | Switzerland | Oct. 16, 1926 |

OTHER REFERENCES

Ser. No. 300,234, Durr et al. (A. P. C.), published Apr. 20, 1943.